US010288513B2

(12) United States Patent
Bae et al.

(10) Patent No.: US 10,288,513 B2
(45) Date of Patent: May 14, 2019

(54) INTEGRATED PRESSURE AND TEMPERATURE SENSOR

(71) Applicant: Sensata Technologies, Inc., Attleboro, MA (US)

(72) Inventors: Jun H. Bae, Medfield, MA (US); Nikhil B. Lal, Providence, RI (US); Guanshi Li, Needham Heights, MA (US); Shuo Robert Chen, Providence, RI (US); Mark W. McBrine, Attleboro, MA (US)

(73) Assignee: Sensata Technologies, Attleboro, MA (US)

( * ) Notice: Subject to any disclaimer, the term of this patent is extended or adjusted under 35 U.S.C. 154(b) by 97 days.

(21) Appl. No.: 15/265,225

(22) Filed: Sep. 14, 2016

(65) Prior Publication Data

US 2018/0073950 A1 Mar. 15, 2018

(51) Int. Cl.
*G01K 13/00* (2006.01)
*G01L 19/00* (2006.01)
(Continued)

(52) U.S. Cl.
CPC .......... *G01L 19/0092* (2013.01); *G01D 21/02* (2013.01); *G01K 1/08* (2013.01);
(Continued)

(58) Field of Classification Search
CPC ............ G01K 7/00; G01K 1/14; G01K 13/00; G01K 15/00; G01K 13/02
(Continued)

(56) References Cited

U.S. PATENT DOCUMENTS 5,070,706 A 12/1991 Waters et al.
6,003,379 A * 12/1999 Ichikawa ............ G01L 19/0092
73/708
(Continued)

FOREIGN PATENT DOCUMENTS

KR 10-1766144 B 8/2017
WO 2007078817 A2 7/2007
WO 2011076482 A1 6/2011

OTHER PUBLICATIONS

Combined Search and Examination Report from corresponding Great Britain Application No. GB1714818.0 dated Mar. 15, 2018.

*Primary Examiner* — Gail Kaplan Verbitsky
(74) *Attorney, Agent, or Firm* — Burns & Levinson, LLP; Joseph M. Maraia

(57) ABSTRACT

A combined pressure and temperature sensing device includes a sensor port geometry that provides improved contact between a fluid media being measured and a thermistor cavity of the sensor port. The increased contact area provides improved response time and accuracy compared to previously known integrated pressure-temperature sensors. A temperature sensor element is offset from a pressure sensor element relative to a central axis of the temperature-pressure sensor body/package to facilitate substantially increasing a pressures sensor cavity volume without increasing the overall sensor port diameter. A wire-bondable thermistor support portion facilitates high volume automated production line. The temperature sensing element may be resistance welded to the thermistor support portion in a parallel manufacturing process.

13 Claims, 6 Drawing Sheets

(51) Int. Cl.
  *G01K 7/22*   (2006.01)
  *G01K 1/08*   (2006.01)
  *G01D 21/02*  (2006.01)

(52) U.S. Cl.
  CPC ............ *G01K 7/22* (2013.01); *G01L 19/0038* (2013.01); *G01L 19/0084* (2013.01)

(58) Field of Classification Search
  USPC ................ 374/141, 143, 163, 185, 208, 147
  See application file for complete search history.

(56) References Cited

U.S. PATENT DOCUMENTS

| | | | |
|---|---|---|---|
| 7,000,478 B1 * | 2/2006 | Zwollo | G01K 1/08 374/E1.011 |
| 7,260,992 B2 * | 8/2007 | Hayashi | G01L 19/0038 73/700 |
| 7,467,891 B2 * | 12/2008 | Gennissen | G01K 13/02 374/141 |
| 8,038,345 B2 * | 10/2011 | Stoll | G01D 11/245 374/143 |
| 8,092,085 B2 * | 1/2012 | Kawase | G01K 7/223 374/183 |
| 9,417,135 B2 * | 8/2016 | Toudou | G01K 7/16 |
| 9,606,010 B2 * | 3/2017 | Kaiser | G01K 13/02 |
| 9,709,461 B2 * | 7/2017 | Lenferink | G01K 1/14 |
| 9,841,335 B2 * | 12/2017 | Rueth | G01L 9/00 |
| 2009/0323760 A1 * | 12/2009 | Gebauer | G01D 11/24 374/143 |
| 2014/0318373 A1 * | 10/2014 | Wood | B01D 71/06 96/11 |
| 2017/0343442 A1 | 11/2017 | Lee et al. | |

\* cited by examiner

INTEGRATED PRESSURE AND TEMPERATURE SENSOR

FIELD OF TECHNOLOGY

The present disclosure relates to the field of automotive sensors and more particularly to the field of integrated pressure and temperature sensors.

BACKGROUND

In certain mechanical systems it is desirable to accurately and rapidly sense the temperature of a fluid and to simultaneously sense a pressure of the fluid at the same location. For example, in certain fuel injected gasoline engines, it is desirable to rapidly measure temperature and pressure of fuel at particular locations within one or more fuel injection pathways.

Traditionally, temperature sensors include a thermistor to measure a temperature of a fluid. In many mechanical systems such as gasoline engines. Traditional pressure sensors generally include a diaphragm type pressure sensing element, or a piezo-electric pressure sensing element. Temperature and pressure sensing elements are generally enclosed within a protective sensor package for protection from environmental forces and corrosive effects of the media being measured.

Thermistors and pressure sensors are generally enclosed within standard sensor packages, which are adapted for threading into standard sized mounting holes. Temperature and pressure sensors used in the automotive industry typically include standard connector configurations for mating to standard automotive connectors.

Combined temperature and pressure sensing devices can include a temperature sensor such as a thermistor and a pressure sensor such as a piezo-electric pressure sensing element within a shared sensor package.

The protective package of a sensor in which a temperature and/or pressure sensing element is contained can detrimentally affect the accuracy and response time of the sensor. For example, protective walls of a sensor around a thermocouple create a thermal barrier between the thermocouple and the fluid media being measured. The thermal barrier substantially delays the response time of the thermocouple. Moreover, in a combined temperature and pressure sensor, the temperature sensing element and pressure sensing element are necessarily displaced some distance from each other. Large displacements between a temperature sensing element and a pressure sensing element prevent the sensor from measuring a temperature and sensor at the same location, as desired in many applications. Also, in certain applications, a substantially off-center sensor can be disadvantages because an off-center sensor element could be deployed in a different location depending on how it tightly the sensor body is threaded into a mounting hole, for example.

Previously known combined temperature and pressure sensors have incorporated various sensor port geometries to improve response time and reduce displacement between pressure and temperature sensing elements, while maintaining a substantially centered location of pressure and temperature sensors.

For example, U.S. Pat. No. 8,038,345 to Stoll et al. entitled Sensor Plug for Combined Pressure and Temperature Measurement describes a sensor plug for temperature and pressure measurement in which a temperature sensor and a pressure sensor are disposed substantially concentrically on the sensor body axis. In order to locate both the temperature sensor and the pressure sensor on the sensor body axis, temperature sensing element orifice has an axis that is inclined with respect to the sensor body axis. A narrow pressure sensing orifice extends in parallel to the temperature sensing orifice. However, the inclined location of the temperature sensing element orifice results in a limited surface area for thermal exchange between the fluid media and the temperature sensor which is mostly embedded inside the sensor body. This hinders thermal transfer between a fluid media being measured and the temperature sensor and thereby results in a relatively slow temperature response.

U.S. Pat. No. 7,434,470 to Engelhardt et al. entitled Combined Pressure and Temperature Sensor describes a combined pressure and temperature sensor in which a pressure sensor is centrally disposed and temperature sensor is enclosed in a cover lobe which is substantially offset from the central axis. The offset location of the temperature sensor constrains access of fluid media to the temperature sensor. This results in a limited surface area for thermal exchange between the fluid media and the temperature sensor which is mostly embedded inside the sensor body, which hinders thermal transfer between the fluid media being measured and the temperature sensor, thereby resulting in a relatively slow temperature response.

SUMMARY

According to an aspect of the present disclosure a combined temperature and pressure sensing device incorporates a MEMS-based pressure measurement apparatus and thermistor-based temperature measurement apparatus in a common package. The combined pressure and temperature sensing device incorporates a sensor port geometry that provides increased contact area between a fluid media being measured and a thermistor cavity of the sensor port. The increased contact area provides improved response time and accuracy compared to previously known integrated pressure-temperature sensors.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1A:
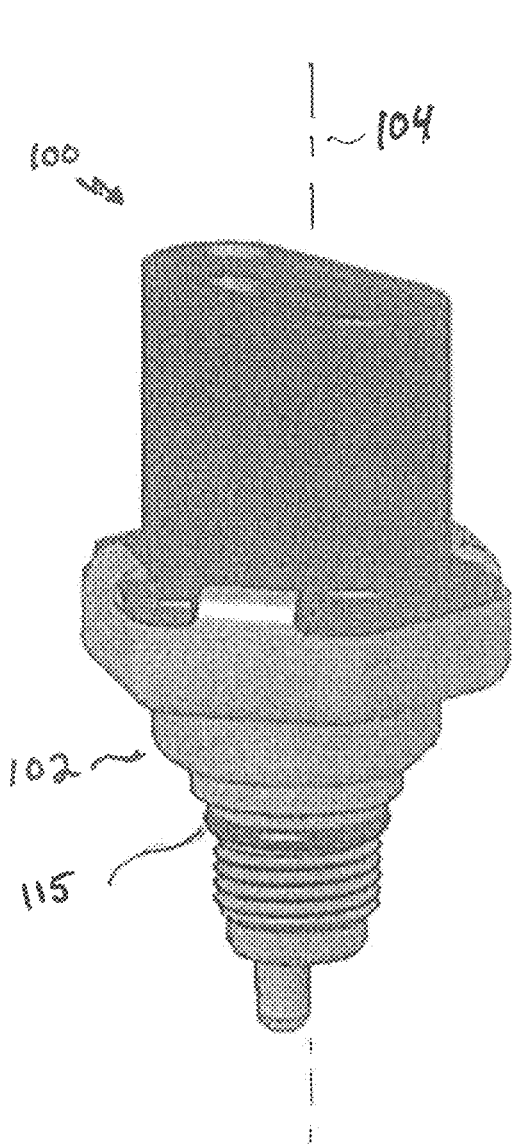
FIGS. 1A-1D illustrate an example embodiment of a combined temperature and pressure sensing device according to an aspect of the present disclosure.
Figure 1B:
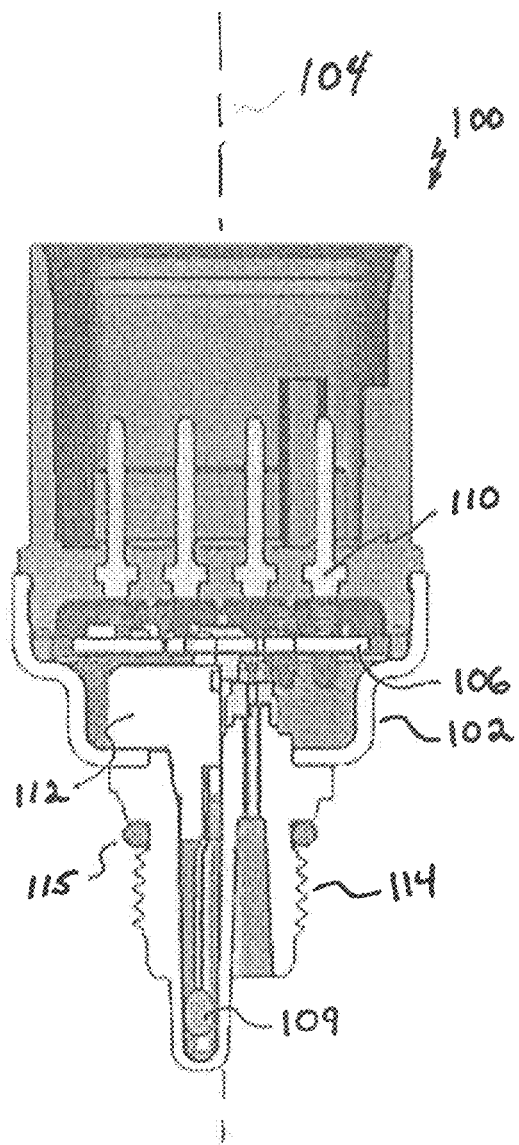

Aspects of the present disclosure include a combined temperature and pressure sensing device having a sensor port geometry that substantially increases exposure of a temperature sensor element to a volume of a fluid medium being measured, while maintaining a substantially centered location of the temperature sensor element and a pressure sensor element within dimensional constraints of a standard automotive sensor package. The disclosed temperature and pressure sensing device improves response time and accuracy of temperature and pressure measurements in mechanical systems, such as automotive fuel system applications, for example. Modular construction aspects of the combined temperature and pressure sensing device are disclosed, which facilitate high volume automated assembly techniques.

FIGS. 1A-1D illustrates an example embodiment of a combined temperature and pressure sensing device 100 according to an aspect of the present disclosure. The combined temperature and pressure sensing device 100 includes a cylindrical housing portion 102 in which a central axis of the cylindrical housing portion 102 defines a central axis 104 of the combined temperature and pressure sensing device 100. The housing portion 102 encloses and supports a printed circuit board 106. A connector receptacle portion 108 extends from a proximal end of the housing portion 102. Connector terminals 110 extend from through the connector receptacle toward the printed circuit board 106. In the illustrative embodiment, connector springs 107 electrically couple the connector terminals 110 to conductive pads on a proximal side of the printed circuit board 106. Conductive paths on the printed circuit board 106 provide electrical coupling from the connector terminals 110 to a temperature sensing element 109 and to a pressure sensing element 111.

The temperature sensing element 109 may be a thermistor, for example. In an illustrative embodiment, the temperature sensing element 109 is a negative temperature coefficient (NTC) thermistor. In an illustrative embodiment, the combined temperature and pressure sensing device 100 combines a micro electromechanical system [MEMS] pressure sensor element and an NTC thermistor in a single hex 24 sensor package.

A sensor port 114 extends distally from a distal surface of the housing portion 102. A proximal portion of the sensor port 114 extends through a distal aperture of the housing portion 102. The sensor port 114 is coupled to and sealed against a distal surface of the housing portion 102. The sensor port 114 may include a circumferential O-ring groove for locating an external O-ring 115.

A temperature sensor carrier 112 is located partially within the housing portion 102 between the printed circuit board 106 and the sensor port. The temperature sensor carrier 112 protrudes through the distal aperture of the housing portion 102 and extends into the sensor port 114.

A pressure sensor support unit 113 is seated on the proximal portion of the sensor port 114. A pressure sensing element 116 is seated between a proximal portion of the pressure sensor support unit 113 and the printed circuit board 106. In an illustrative embodiment, a hermetic seal may be formed around the pressure sensing element and a pressure sensing orifice of the sensor port 114.

In an illustrative embodiment, the pressure sensing element may comprise a micro electromechanical system [MEMS] pressure sensor. It should be understood that alternative embodiments of the disclosed combined temperature and pressure sensing device may include different types of pressure sensor elements and may not necessarily include a MEMS pressure sensor.

According to aspects of the present disclosure the sensor port 114 includes a cavity that is shaped to provide a maximal contact (area or volume) to an application media. The maximal contact area or volume allows faster and more accurate temperature sensing.

In an illustrative embodiment, the combined temperature and pressure sensing device includes standard external portions such as a threaded mounting interface portion and a connector receptacle portion, which are compatible with common automotive applications and tooling.

Figure 1C:
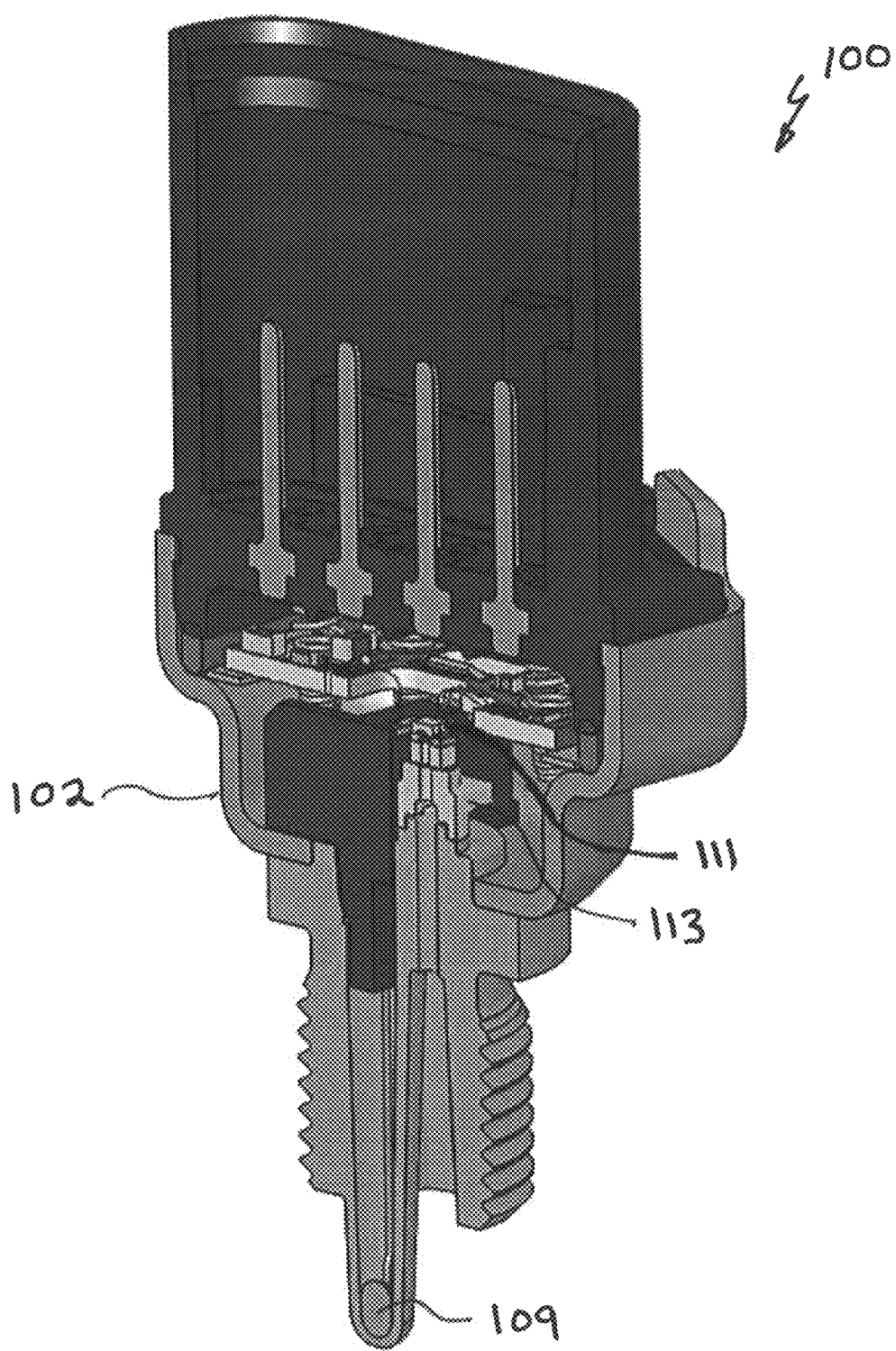
Figure 1D:
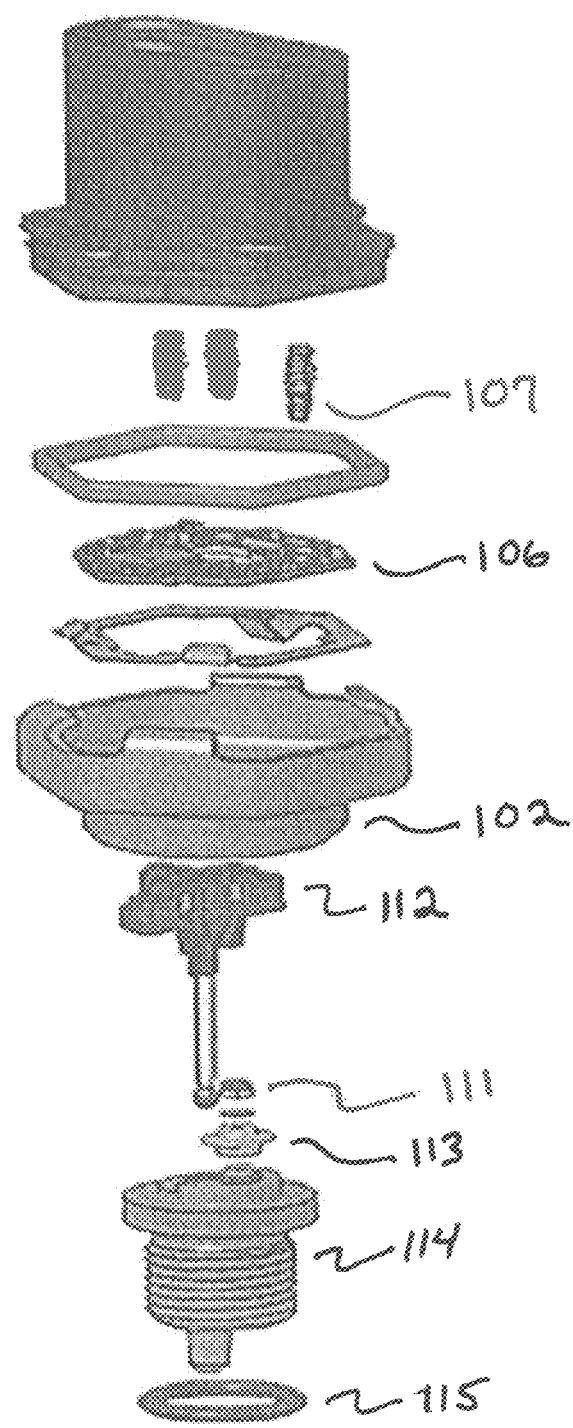

FIG. 1C is a three dimensional section view of the combined temperature and pressure sensing device 100. FIG. 1D is a three dimensional exploded view showing the components and portions of the temperature and pressure sensing device 100.

In the disclosed combined temperature and pressure sensing device, the geometry of the sensor port 115 provides substantially advantages, including substantially reduced temperature sensor response time, compared to previously known sensor devices. In an illustrative embodiment, the disclosed sensor port geometry provides a temperature sensor surface area that is about eleven times larger than previously known sensors, and encloses a media volume that is about six times larger than previously known sensors. The disclosed sensor device provides more accurate measurements of temperature and pressure allowing improved fuel efficiency and improved emissions control in automotive applications, for example.

Figure 2A:
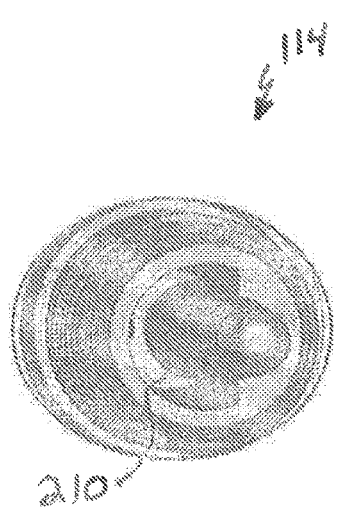
FIGS. 2A-2B illustrate an example embodiment of sensor port of a combined temperature and pressure sensing device according to an aspect of the present disclosure.
Figure 2B:
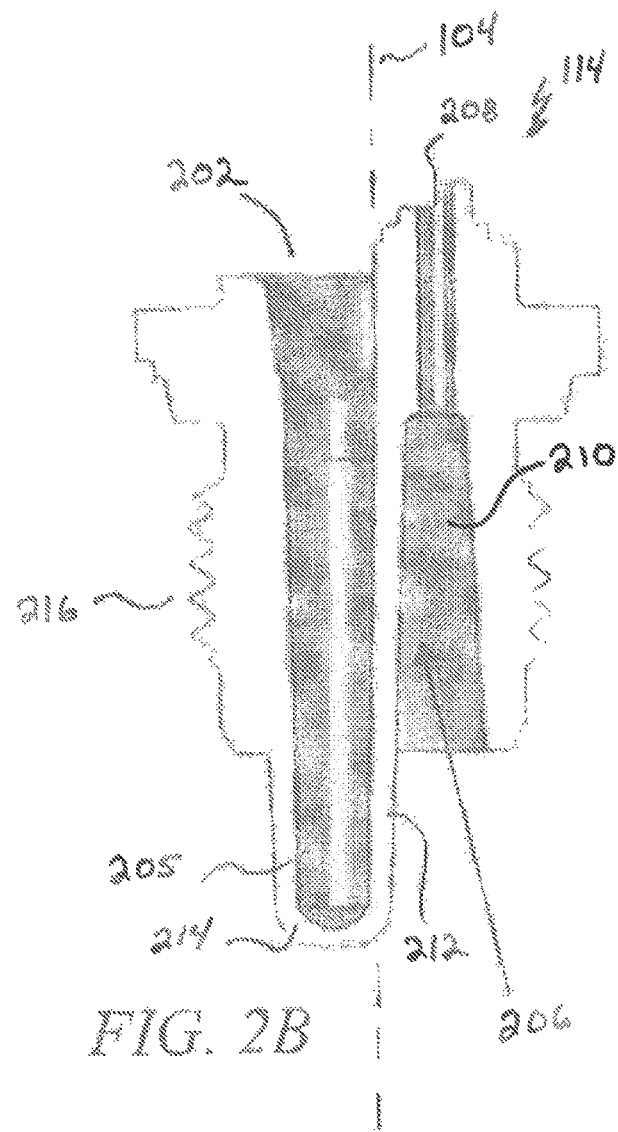

Referring to FIGS. 2A-2B, a first cavity 202 of the sensor port 114 extends through a cylindrical body portion 204 of the sensor port 114 adjacent the central axis 104 of the combined temperature and pressure sensing device 100. The first cavity 202 includes a tubular orifice 205 offset from the central axis 104. The tubular orifice 204 extends from an open proximal end of the tubular orifice 205 to an enclosed distal end of the tubular orifice 205. The tubular orifice 205 defines an off-centered tube that houses the temperature sensing element and protects it from the environment.

According to another aspect of the present disclosure, the combined temperature and pressure sensing device 100 includes a lobe 214 extending distally from the cylindrical body portion 204 of the sensor port 114. The lobe 214 includes the enclosed distal end of the tubular orifice 205.

According to an aspect of the present disclosure, the sensor port 104 also includes a second cavity 206 extending through the cylindrical body portion 204 from an open distal end of the second cavity 206 to a proximal through-hole 208 in the cylindrical body portion 204 offset from the central axis 104. The second cavity 206 defines a second orifice 210 extending from the open distal end of the second cavity 206 toward the proximal through-hole 208 and partially surrounding the tubular orifice 205. A semi-circular wall 212 defines a boundary between the tubular orifice 205 and the semicircular orifice 210. The off-center through hole 208 guides fluid media being measured toward the pressure sensing element located at the proximal end of the though hole 208.

According to an aspect of the present disclosure, the second orifice 210 partially surrounds the tubular orifice 205. This increases contact area between a fluid media being measured and the tubular orifice 205, which houses the temperature sensing element and thereby improves temperature measurement response time and accuracy of the disclosed sensor device. In an example embodiment, the second orifice 210 may be semi-circular and may have half-moon shaped cross section, for example. The second orifice 210 may taper toward the through-hole 208.

The semi-circular and/or half-moon shaped cross section of the second orifice 210 allows the fluid media being measured to partially surround a large portion of the temperature sensing tube/orifice. This greatly increases the contact area and thermal interface between the media being measured and the temperature sensor while maintaining a limited and/or standard external dimension of the sensor package.

In illustrative embodiments, the sensor port 114 may include a threaded external surface 216 as shown in FIGS. 1A-2B for mounting the sensor to a wall of a fluid pathway, for example. It should be understood that various alternative embodiments of the disclosed combined temperature and pressure sensing device may include a sensor port 114 having an outer surface that is not threaded.

According to an aspect of the present disclosure, the sensor port 114 may be constructed using metal injection molding techniques in which a threaded external surface of the sensor port may be formed by a subsequent machining process. Suitable materials for the sensor port include 17-4 stainless steel.

Figure 3:
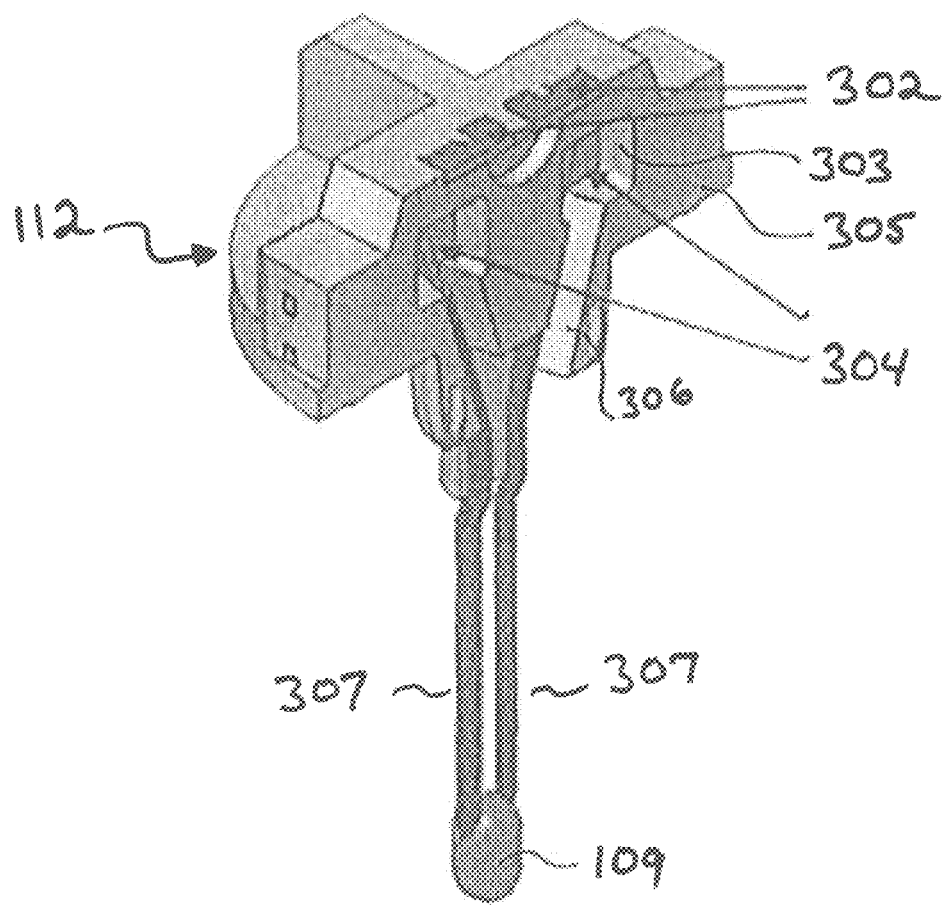
FIG. 3 illustrates an example embodiment of temperature sensing element carrier of a combined temperature and pressure sensing device according to an aspect of the present disclosure.

According to another aspect of the present disclosure, the combined temperature and pressure sensing device includes a temperature sensor carrier 112. The temperature sensor carrier 112 is configured to allow flexibility of manufacturing processes. The temperature sensor carrier 112 is installed into the open proximal end of the tubular orifice 205. Referring to FIG. 3, the temperature sensor carrier 112 includes a conductive proximal surface 302, and a temperature sensing element 109 electrically coupled to the conductive proximal surface 302. The conductive proximal surface 302 may be a wire bondable surface for wire-bonding to a conductive pad on the printed circuit board 106, for example. Materials suitable for the wire bondable surface include aluminum, and gold, for example.

In an illustrative embodiment, the conductive proximal surface 302 is formed on a conductive tab that extends through a molded portion 305 of the temperature sensor carrier 112. The temperature sensor carrier 112 includes a pair of the conductive tabs for coupling to corresponding terminals 307 of the temperature sensing element 109. The conductive tabs may be insert-molded into the molded portion 305, for example.

A distal portion of each of the conductive tabs includes a resistance weldable surface 304. The resistance weldable surface 304 of each of the conductive tabs is exposed from the molded portion 305 in a corresponding weld window 303. A slot 306 in the molded portion 305 extends distally from each of the weld windows 303. The slots 306 are configured for locating a corresponding terminal 307 of the temperature sensing element 109. The terminals 307 of the temperature sensing element 109 are resistance welded to the resistance weldable surfaces 304 of the conductive tabs. Materials suitable for the resistance weldable surface include bronze, tin and gold, for example.

After the terminals are welded to the resistance weldable surface, the temperature sensing element is installed in the enclosed distal end of the tubular orifice.

Figure 4:
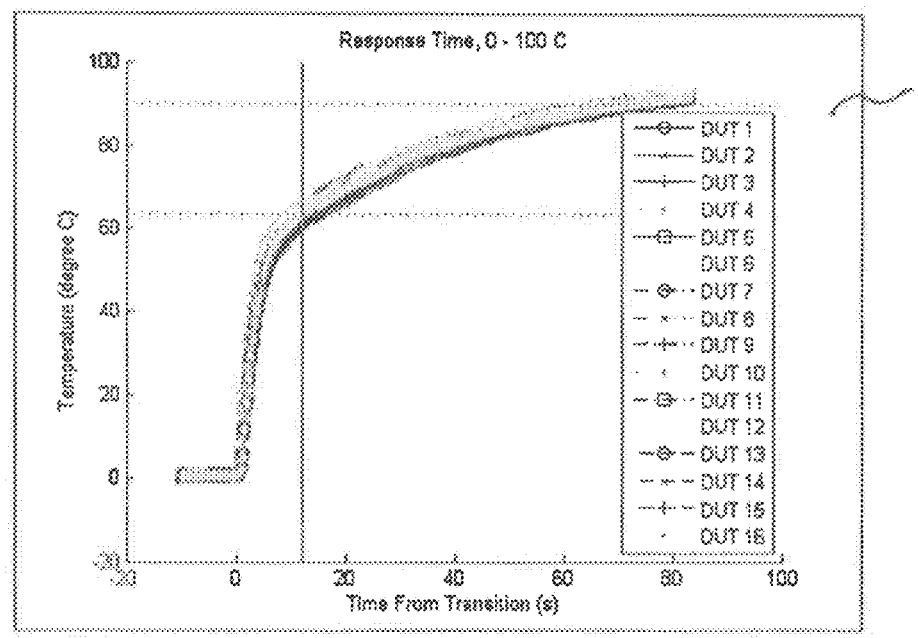
FIG. 4 illustrates a response time graph for samples of a temperature and pressure sensing device according to an aspect of the present disclosure compared to a response time graph for samples of a previously known temperature and pressure sensing device.
Figure 4:
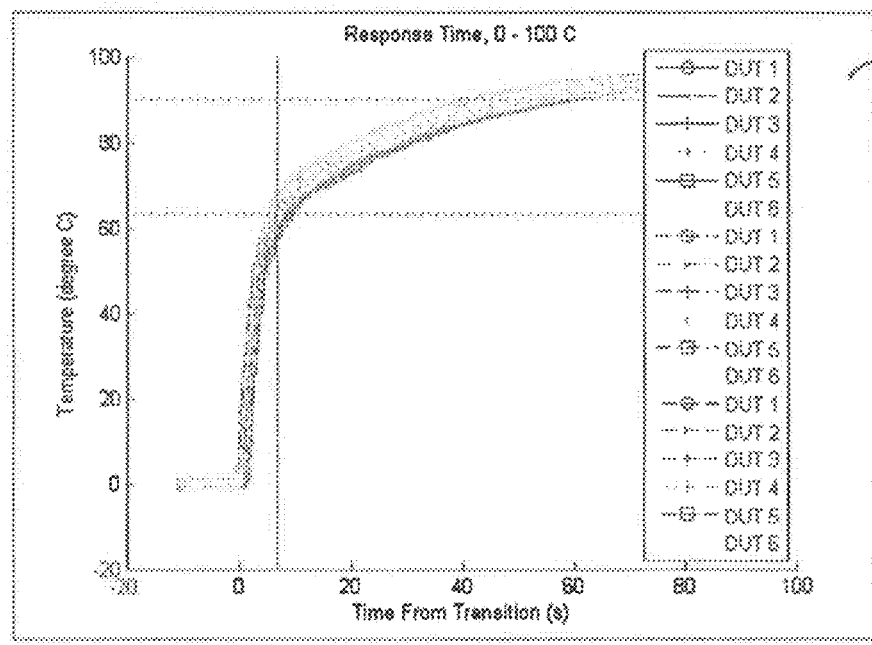

FIG. 4 shows a response time graph 402 of a previously known temperature and pressure sensing device, compared to a response time graph 404 of a combined temperature and pressure sensing device that includes the aspects disclosed herein. The response time graphs 402, 404 were generated by bathing several samples of each device in a fluid media at 0 degrees C. until each device reached thermal equilibrium, then placing each device directly into a silicone oil bath at 100 degrees C. The average time for the samples of previously known devices to reach a temperature of 63 degrees C. after being immersed in the silicone oil bath was 12.02 seconds. The average time for the samples of presently disclosed temperature and sensor devices to reach 63 degrees C. after being immersed in the silicone oil bath was 6.81 seconds.

The foregoing description of embodiments is intended to provide illustration and description but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A combined temperature and pressure sensing device, comprising:
    a single piece body, the single piece body comprising:
        a cylindrical body portion defining a central axis;
        a first cavity extending through the cylindrical body portion adjacent the central axis, the first cavity comprising:
            a tubular orifice offset from the central axis and extending from an open proximal end of the tubular orifice to an enclosed distal end of the tubular orifice;
        a lobe of the single piece body extending distally from the cylindrical body portion enclosing the distal end of the tubular orifice;
        a second cavity extending through the cylindrical body portion from an open distal end of the second cavity to a proximal through-hole in the cylindrical body portion offset from the central axis, the second cavity comprising:
            a second orifice extending from the open distal end of the second cavity toward the proximal through-hole and extending around the tubular orifice; and
        a wall defining a boundary between the tubular orifice and the second orifice.

2. The device of claim 1, wherein the wall includes a semi-circular geometry in a cross-section perpendicular to the central axis.

3. The device of claim 1, comprising:
    a temperature sensor carrier installed into the open proximal end of the tubular orifice, the temperature sensor carrier comprising:
        a conductive proximal surface;
        a temperature sensing element electrically coupled to the conductive proximal surface and installed in the enclosed distal end of the tubular orifice.

4. The device of claim 3, comprising:
    an electrically conductive member extending distally from the wire bondable proximal surface to a resistance weldable surface, the resistance weldable surface welded to a terminal of the temperature sensing element.

5. The device of claim 3, wherein the conductive proximal surface comprises a wire bondable surface.

6. The device of claim 3, wherein the temperature sensing element comprises a thermistor.

7. The device of claim 6, wherein the thermistor comprises a negative temperature coefficient (NTC) thermistor.

8. The device of claim 3, comprising a pressure sensing element hermetically sealed over the proximal through-hole.

9. The device of claim 3, comprising a threaded portion on an external circumference of the cylindrical body portion.

10. The device of claim 3, comprising a printed circuit board having one or more conductive pads wire-bonded to the conductive surface.

11. The device of claim 1, wherein the second orifice has a semi-circular cross section.

12. The device of claim 1, wherein the second orifice is tapered toward the through-hole.

13. The device of claim 1, comprising a connector portion mechanically coupled to the cylindrical body portion.

* * * * *

UNITED STATES PATENT AND TRADEMARK OFFICE
CERTIFICATE OF CORRECTION

Page 1 of 1

PATENT NO. : 10,288,513 B2
APPLICATION NO. : 15/265225
DATED : May 14, 2019
INVENTOR(S) : Bae et al.

It is certified that error appears in the above-identified patent and that said Letters Patent is hereby corrected as shown below:

On the Title Page

Item (72) Inventor is corrected to read:
-- Jun H. Bae, Medfield (MA);
Nikhil B. Lal, Providence (RI);
Guanshi Li, Needham Heights (MA);
Shuo Robert Chen, Providence (RI);
Mark W. McBrine, Attleboro (MA);
Joseph E. Pentecost, Jamaica Plain (MA) --.

Signed and Sealed this
Second Day of June, 2020

Andrei Iancu
*Director of the United States Patent and Trademark Office*